June 7, 1949.  C. N. CROSS  2,472,405
EASEL HINGE
Filed July 23, 1945
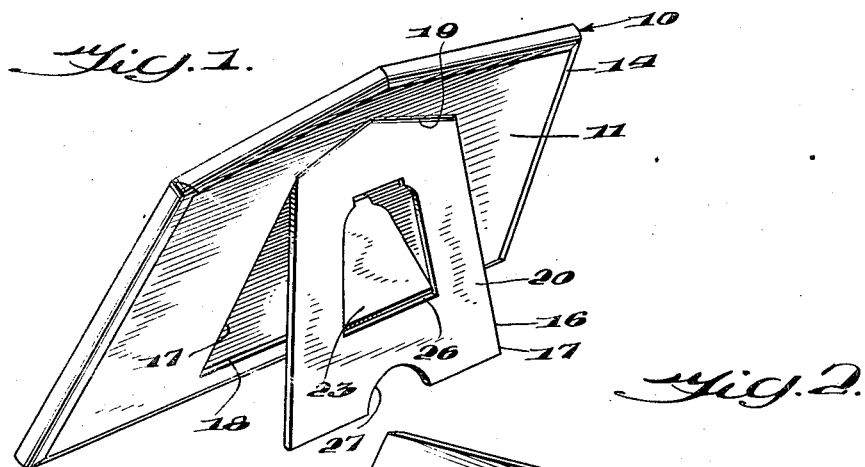
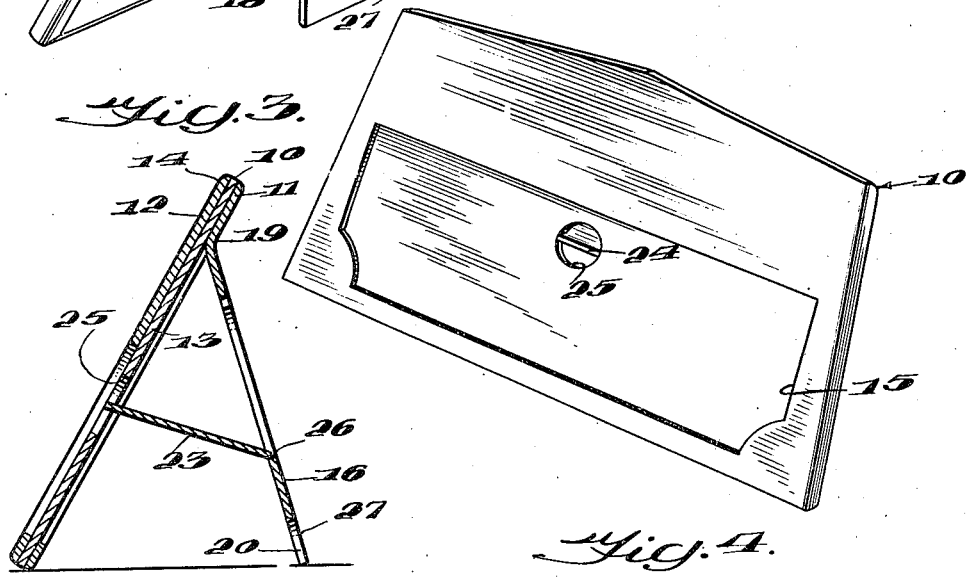
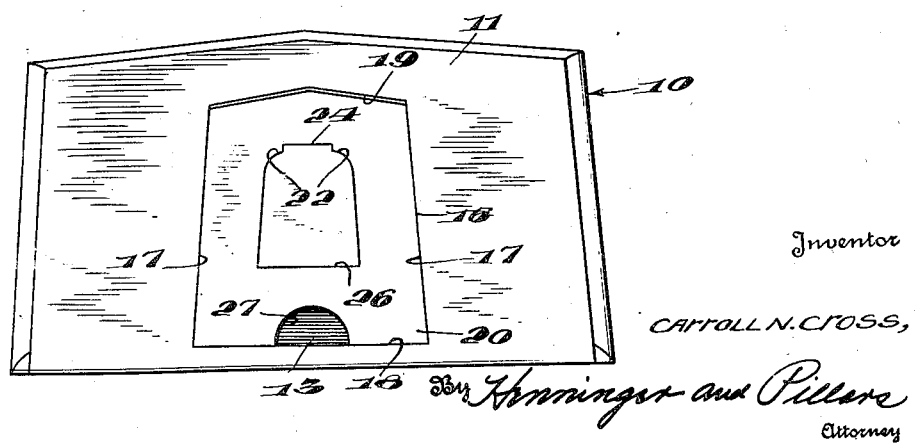
Inventor
CARROLL N. CROSS,
By Henninger and Pillars
Attorney Patented June 7, 1949

2,472,405

UNITED STATES PATENT OFFICE 2,472,405

EASEL HINGE

Carroll N. Cross, Middleboro, Mass.

Application July 23, 1945, Serial No. 606,649

4 Claims. (Cl. 248—35)

This invention relates to hinges and has for its object the provision of new and improved hinge connections between display mount bodies and supporting structures therefor.

In the past, display mounts of the type having easel members formed integrally with the back boards thereof have been hinged to the back boards along straight lines. In the use of such mounts, it has been difficult to prevent the easel member from spreading with respect to the back board to such an extent that the mount was not held in a proper display position.

A hinge forming one embodiment of the invention comprises a base member and a support member secured to the base member for pivotal movement with respect thereto along a deflected line which may be either curved or angular. A hinge formed along a deflected line as taught herein will mount the support member for angular movement in such manner as to exert a constant resistance against the movement of the support out of the plane of the base member, thereby insuring that the support will not spread too far with respect to the base on which it is hinged.

Further objects and advantages of the invention will be apparent from the following detailed description of hinged members forming a specific embodiment of the invention, when read in conjunction with the appended drawing, in which:

Figure 1 is a rear, perspective view of a display mount having a pair of hinged members forming one embodiment of the invention;

Figure 2 is a front, perspective view of the mount;

Figure 3 is a vertical section of the mount, a flexible covering having been omitted for purpose of simplification; and Figure 4 is a rear view of the mount.

Referring now in detail to the drawing, a display mount 10 includes a back board 11 (Figure 3), which is made of cardboard or other flexible material, and a faceboard 12 with a center board 13 positioned therebetween. The several boards constituting the mount may be secured into a unitary structure by means of a binding member 14 which extends about the marginal edges of the mount and covers the faces thereof. The face board has a picture display window 15 (Figure 2) formed therein through which a picture may be viewed.

A supporting prop or easel member 16 is formed in the back board 11 by cutting the back board along upright lines 17—17 and along an interconnecting base line 18 (Figure 4). A deflected hinge line is formed in the zone at which the supporting prop 16 is attached to the back board and, for purpose of illustration, the line is herein illustrated as being described by a pair of angularly related extending creases 19. In this illustrative embodiment, the upwardly converging legs of the hinge line connect the upper ends of the lines 17—17 and form the upper edge of a leg 20 of the easel member. The angularly extending crease weakens the back board along the crease so that the back board bends along the crease when the leg is moved from its closed position, as illustrated in Figure 4, to its open position, as illustrated in Figure 3. That is, the angularly extending crease forms the pivot line for angular movement of the leg with respect to the remainder of the back board.

The leg 20, which is joined to the back board 11 along the angularly extending crease 19, is limited in its counter-clockwise movement, as viewed in Figure 3, due to the fact that it tends to pivot about a deflected line. This limiting action is a result of the increase in compressive forces exerted on the resilient fibers along opposite sides of the deflected hinge line. The compression of the fibers appears to be most pronounced at the outer extremities of the deflected line. Therefore, the resiliency of the mount stock causes the leg to be urged strongly in a clockwise direction, as viewed in Figure 3, when it is in its open position and thrusts shoulder 22—22 (Figure 4) formed on a locking tongue 23 against the center board 13. The locking tongue has a tab 24, which is designed to project into a hole 25 formed in the center board, and serves to hold the leg in its open position. The locking tongue is formed integrally with the leg and is pivotable relative thereto along a scored line 26. A thumbhole 27 is formed in the bottom portion of the leg to facilitate moving the leg from its closed position to its open position.

In the use of the display mount 10, the leg 20 is moved to its open position and pivots about the deflected crease 19. The locking tongue 23 then is pivoted with respect to the leg and the tab 24 is positioned in the hole 25 formed in the center board. The mount then may be placed on a desk or other supporting surface where the easel member 16 will support the mount in substantially upright display position.

Due to the configuration of the angularly extending crease 19, the leg 20 is urged toward its closed position at all times. This urging action is not weakened by extensive use of the mount but remains strong indefinitely.

It is to be understood that the invention may be embodied in a number of forms and that the embodiment described hereinabove is disclosed for purposes of illustration only and does not limit the scope of the invention, which is limited only by the appended claims.

I claim:

1. A display mount including a back board, a supporting prop having free side edges and a free end adapted for angular movement away from said back board into mount-supporting position, a hinge connection between said back board and the other end of said prop, said connection deviating from a straight line drawn between the side edges of said prop, whereby a wedging effect is obtained at said hinge line tending to urge said prop into closed position.

2. A display mount including a back board, a second board, a supporting prop having free side edges and a free outer end adapted for angular movement away from said back board into mount-supporting position, said supporting prop being integrally connected at its inner end to said back board, a score line constituting a hinge extending between said free side edge at the inner end of said prop, and a locking tongue carried by said prop for angular movement with respect thereto, said tongue having a free end adapted to engage said second board when said prop is in mount-supporting position, the score line at the inner end of said prop deviating from a straight line drawn between the side edges of said prop whereby a wedging effect is obtained at said hinge line tending to urge said prop into closed position.

3. A display mount including a back board, a panel having free side edges and a free end formed in said board for angular movement toward and away from said board, a score line constituting a hinge connection between said board and the end of said panel remote from the free end thereof, said score line deviating from a straight line drawn between the side edges of said panel, whereby a wedging effect is obtained at said hinge line tending to urge said panel into closed position.

4. A display mount including a plurality of cardboard sections constituting a supporting structure for display material, a panel having free side edges and a free end formed in the body of one of said sections, a score line extending across the base of said panel remote from its free end constituting a hinge about which said panel may swing towards and away from said section, said score line deviating from a straight line drawn between side edges of said panel, whereby a wedging effect is obtained at said score line tending to urge said panel into closed position.

CARROLL N. CROSS.

REFERENCES CITED

The following references are of record in the file of this patent:

UNITED STATES PATENTS

| Number | Name | Date |
|---|---|---|
| 246,081 | Caterson | Aug. 23, 1881 |
| 868,998 | Lang | Oct. 22, 1907 |
| 2,172,273 | Chilcote | Sept. 5, 1939 |
| 2,232,466 | McKeown | Feb. 18, 1941 |
| 2,377,487 | Fox | June 5, 1945 |